US012608176B1

(12) United States Patent　　(10) Patent No.:　US 12,608,176 B1
Li et al.　　　　　　　　　　　　(45) Date of Patent:　　Apr. 21, 2026

(54) METHOD, APPARATUS AND DEVICE FOR AUTOMATED CONTROL CODE GENERATION AND VERIFICATION, AND STORAGE MEDIUM

(71) Applicants: The Hong Kong University of Science and Technology (Guangzhou), Guangzhou (CN); Shenzhen Softwin Technology Co., Ltd., Shenzhen (CN)

(72) Inventors: Yin Li, Guangzhou (CN); Fu-Gee Tsung, Guangzhou (CN)

(73) Assignees: The Hong Kong University of Science and Technology (Guangzhou), Guangzhou (CN); Shenzhen Softwin Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/238,765

(22) Filed: Jun. 16, 2025

(30) Foreign Application Priority Data

Apr. 9, 2025　(CN) ......................... 202510444191.9

(51) Int. Cl.
　　*G06F 9/44*　　　　(2018.01)
　　*G06F 8/30*　　　　(2018.01)
　　　　　　(Continued)

(52) U.S. Cl.
　　CPC ............ *G06F 8/30* (2013.01); *G06F 16/3347* (2019.01); *G06F 40/30* (2020.01)

(58) Field of Classification Search
　　CPC ......... G06F 8/30; G06F 16/3347; G06F 40/30
　　See application file for complete search history.

(56) References Cited

U.S. PATENT DOCUMENTS 12,210,839 B1 *　1/2025　Burton .................. G06T 11/206
2023/0109681 A1 *　4/2023　Gotmare ............... G06N 3/047
　　　　　　　　　　　　　　704/9
(Continued)

FOREIGN PATENT DOCUMENTS

CN　　　101751005　A　　6/2010
CN　　　113885426　A　　1/2022
　　　　(Continued)

OTHER PUBLICATIONS

English translation, Albert (WO 2024145209 A1), 2024, p. 1-42. (Year: 2024).*

(Continued)

*Primary Examiner* — Mongbao Nguyen
(74) *Attorney, Agent, or Firm* — Westbridge IP LLC

(57)　　　　　ABSTRACT

A method for automated control code generation and verification includes: receiving a natural language command, the natural language command being configured to instruct the large language model to output a code text that meets control requirements corresponding to the natural language command; performing matching retrieval on a vector database according to the natural language command to obtain a sample code snippet; obtaining API structured information corresponding to the sample code snippet from a knowledge graph database; generating an initial control code according to the sample code snippet and the API structured information; and performing a multi-level virtual operation verification on the initial control code in a software motion control system, and generating a target control code according to multi-level verification results confirmed multiple times by the user and the initial control code.

5 Claims, 9 Drawing Sheets

(51) Int. Cl.
    *G06F 9/445*     (2018.01)
    *G06F 9/45*     (2006.01)
    *G06F 9/455*     (2018.01)
    *G06F 16/334*     (2025.01)
    *G06F 40/30*     (2020.01)

(56) References Cited

U.S. PATENT DOCUMENTS

| | | | |
|---|---|---|---|
| 2024/0020096 A1* | 1/2024 | Chen | G06F 40/30 |
| 2024/0281600 A1* | 8/2024 | Brown | G06F 8/30 |
| 2024/0402999 A1 | 12/2024 | Chen et al. | |
| 2025/0013438 A1* | 1/2025 | Goodman | G06F 8/30 |
| 2025/0045256 A1* | 2/2025 | Gottlob | G06F 16/211 |
| 2025/0225143 A1* | 7/2025 | Fozdar | G06F 8/20 |
| 2025/0231947 A1* | 7/2025 | Files | G06F 16/24568 |
| 2025/0245425 A1* | 7/2025 | Ayed | G06F 40/284 |
| 2025/0291559 A1* | 9/2025 | Lu | G06F 40/40 |

FOREIGN PATENT DOCUMENTS

| | | | | |
|---|---|---|---|---|
| CN | 116909574 A | 10/2023 | | |
| CN | 119149042 A | 12/2024 | | |
| CN | 119201059 A | 12/2024 | | |
| CN | 119396400 A | 2/2025 | | |
| WO | WO-2024145209 A1 * | 7/2024 | | G06N 3/045 |
| WO | WO-2025072894 A1 * | 4/2025 | | G06N 20/00 |

OTHER PUBLICATIONS

English translation, William (WO 2025072894 A1), 2025, pp. 1-100. (Year: 2025).*
Heiko Koziolek, LLM-based and Retrieval-Augmented Control Code Generation, 2024, pp. 1-8. https://llm4code.github.io/2024/assets/pdf/papers/39.pdf (Year: 2024).*
First Office Action issued in counterpart Chinese Patent Application No. 202510444191.9, dated Dec. 13, 2025.
Jiang et al., Self-Planning Code Generation with Large Language Models, ACM Transactions on Software Engineering and Methodology, vol. 33, No. 7, dated Sep. 27, 2024.
Notification to Grant Patent Right for Invention issued in counterpart Chinese Patent Application No. 202510444191.9, dated Feb. 16, 2026.

* cited by examiner

Performing semantic analysis on a code generation statement to obtain a main control task — A1

Decomposing the main control task to obtain several control subtasks — A2

Performing matching retrieval on the vector database according to the control subtasks to obtain the sample code snippet — A3

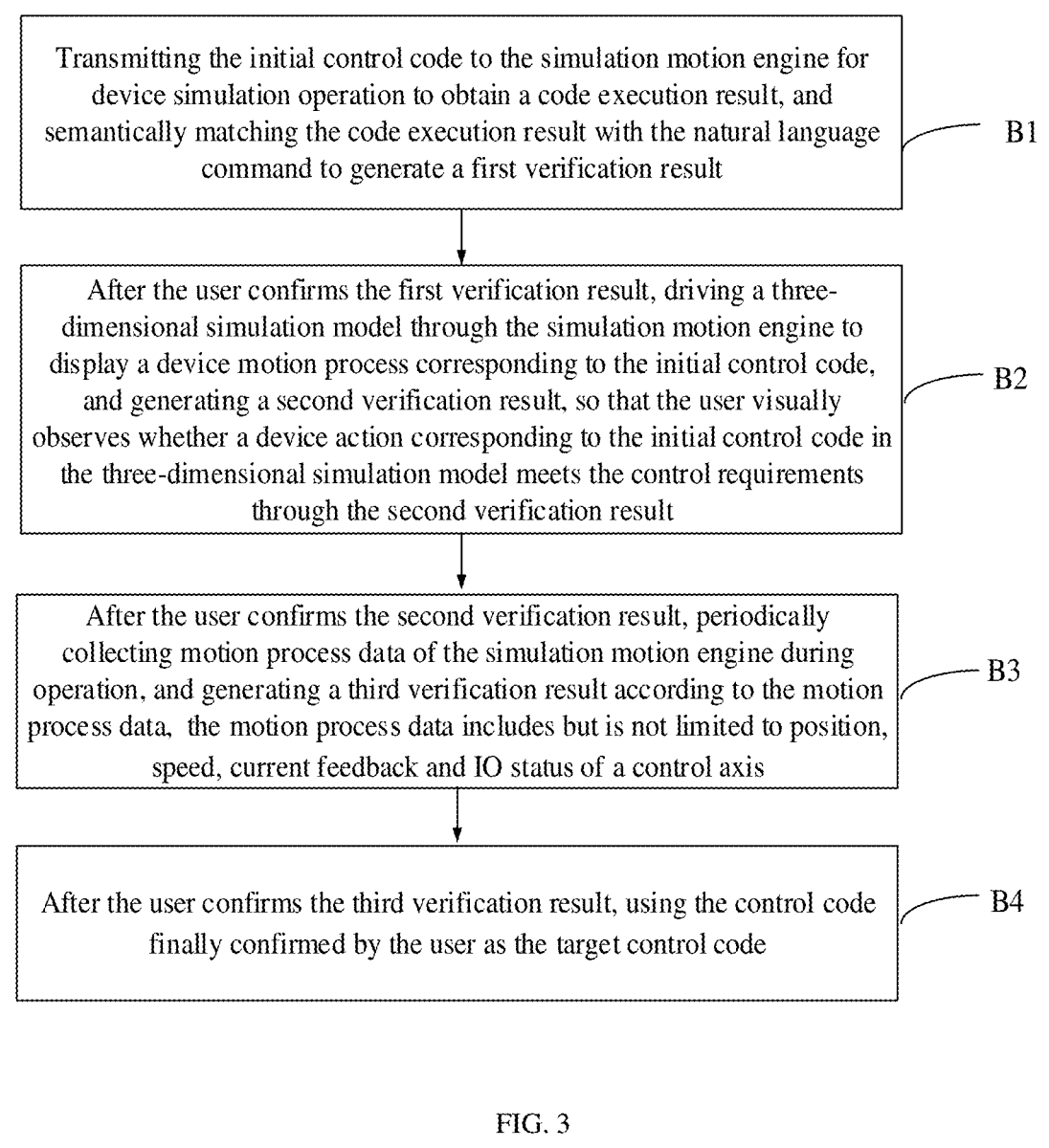

Transmitting the initial control code to the simulation motion engine for device simulation operation to obtain a code execution result, and semantically matching the code execution result with the natural language command to generate a first verification result — B1

After the user confirms the first verification result, driving a three-dimensional simulation model through the simulation motion engine to display a device motion process corresponding to the initial control code, and generating a second verification result, so that the user visually observes whether a device action corresponding to the initial control code in the three-dimensional simulation model meets the control requirements through the second verification result — B2

After the user confirms the second verification result, periodically collecting motion process data of the simulation motion engine during operation, and generating a third verification result according to the motion process data, the motion process data includes but is not limited to position, speed, current feedback and IO status of a control axis — B3

After the user confirms the third verification result, using the control code finally confirmed by the user as the target control code — B4

FIG. 3

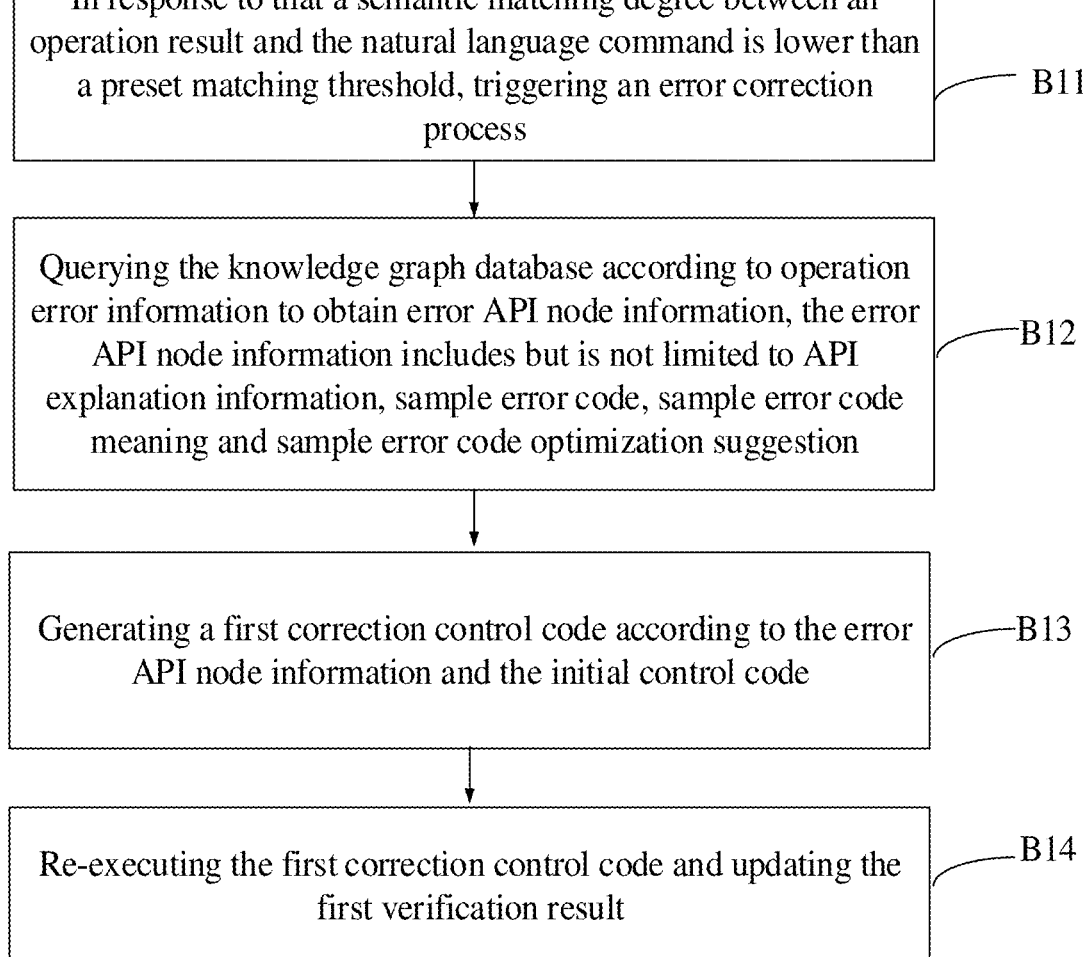

In response to that a semantic matching degree between an operation result and the natural language command is lower than a preset matching threshold, triggering an error correction process ⟋— B11

Querying the knowledge graph database according to operation error information to obtain error API node information, the error API node information includes but is not limited to API explanation information, sample error code, sample error code meaning and sample error code optimization suggestion ⟋—B12

Generating a first correction control code according to the error API node information and the initial control code ⟋—B13

Re-executing the first correction control code and updating the first verification result ⟋—B14

FIG. 4

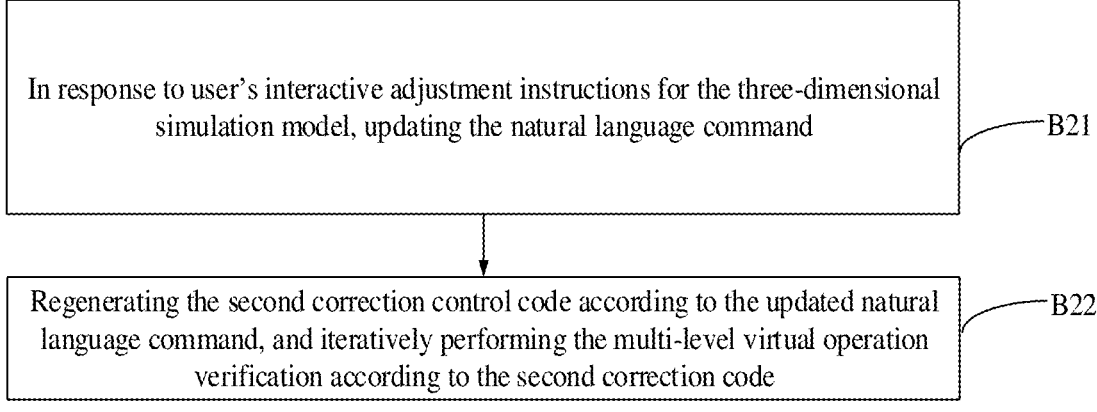

In response to user's interactive adjustment instructions for the three-dimensional simulation model, updating the natural language command ⎯B21

Regenerating the second correction control code according to the updated natural language command, and iteratively performing the multi-level virtual operation verification according to the second correction code ⎯B22

FIG. 5

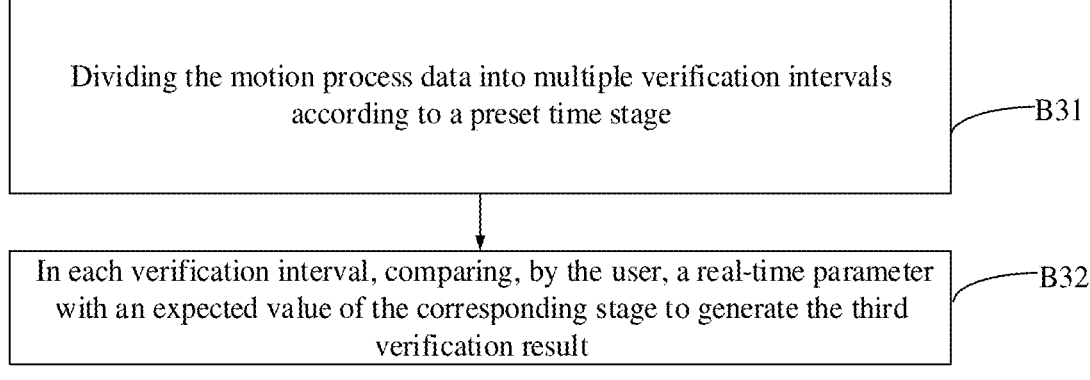

Dividing the motion process data into multiple verification intervals according to a preset time stage ⎯B31

In each verification interval, comparing, by the user, a real-time parameter with an expected value of the corresponding stage to generate the third verification result ⎯B32

FIG. 6

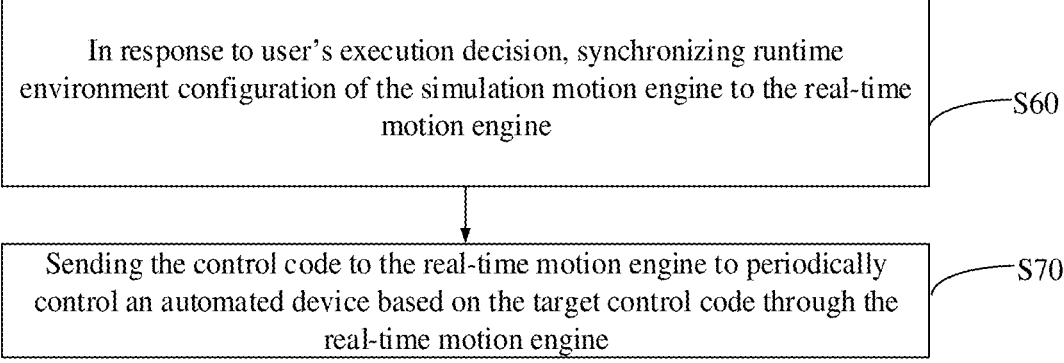

In response to user's execution decision, synchronizing runtime environment configuration of the simulation motion engine to the real-time motion engine ⎯S60

Sending the control code to the real-time motion engine to periodically control an automated device based on the target control code through the real-time motion engine ⎯S70

FIG. 7

METHOD, APPARATUS AND DEVICE FOR AUTOMATED CONTROL CODE GENERATION AND VERIFICATION, AND STORAGE MEDIUM

CROSS-REFERENCE TO RELATED APPLICATIONS

This application claims priority to Chinese Patent Application No. 202510444191.9, filed on Apr. 9, 2025, the entire contents of which are incorporated herein by reference.

TECHNICAL FIELD

The present application relates to the technical field of automated control, and in particular to a method, an apparatus and a device for automated control code generation and verification, and a storage medium.

BACKGROUND

The current programming methods of automated control systems mainly include manual programming and templated programming, both of which face significant challenges in terms of complexity and security. Manual programming is limited by the experience and ability of developers, as well as the factors of setting and learning a large number of Application Programming Interface (API) functions, and is prone to generation errors and long development and debugging cycles. The template design of templated programming is usually difficult to cope with complex scenarios or personalized needs, which limits the adaptability and scalability of the system. In addition, after the initial generation of the code is completed, it is necessary to repeatedly debug and test the hardware and code to determine the appropriate parameters corresponding to the code, and the code generation is finally completed, and the comprehensive generation of the code takes a long time.

Therefore, the current generation technology of automated control code has a series of problems such as poor flexibility, insufficient accuracy, and low efficiency. How to overcome these technical difficulties and improve the efficiency and reliability of automated control code generation has become a key issue that needs to be solved in this field.

SUMMARY

The main objective of the present application is to provide a method, an apparatus and a device for automated control code generation and verification, and a storage medium, aiming to solve the technical problem of how to improve the efficiency and reliability of automated control code generation.

In order to achieve the above objective, the present application provides a method for automated control code generation and verification, applied to a large language model, including:

receiving a natural language command, the natural language command is configured to instruct the large language model to output a code text that meets control requirements corresponding to the natural language command;

performing matching retrieval on a vector database according to the natural language command to obtain a sample code snippet;

obtaining Application Programming Interface (API) structured information corresponding to the sample code snippet from a knowledge graph database;

generating an initial control code according to the sample code snippet and the API structured information; and performing a multi-level virtual operation verification on the initial control code in a software motion control system, and generating a target control code according to to multi-level verification results confirmed multiple times by the user and the initial control code.

In an embodiment, the performing matching retrieval on the vector database according to the natural language command to obtain the sample code snippet includes:

performing semantic analysis on a code generation statement to obtain a main control task;

decomposing the main control task to obtain several control subtasks; and performing matching retrieval on the vector database according to the control subtasks to obtain the sample code snippet.

In an embodiment, the software motion control system includes a simulation motion engine, and the performing the multi-level virtual operation verification on the initial control code in the software motion control system, and generating the target control code according to multi-level verification results confirmed multiple times by the user and the initial control code includes:

transmitting the initial control code to the simulation motion engine for device simulation operation to obtain a code execution result, and semantically matching the code execution result with the natural language command to generate a first verification result;

after the user confirms the first verification result, driving a three-dimensional simulation model through the simulation motion engine to display a device motion process corresponding to the initial control code, and generating a second verification result, so that the user visually observes whether a device action corresponding to the initial control code in the three-dimensional simulation model meets the control requirements through the second verification result;

after the user confirms the second verification result, periodically collecting motion process data of the simulation motion engine during operation, and generating a third verification result according to the motion process data, wherein the motion process data includes but is not limited to position, speed, current feedback and IO status of a control axis; and after the user confirms the third verification result, using the control code finally confirmed by the user as the target control code.

In an embodiment, the generating the first verification result includes:

in response to that a semantic matching degree between an operation result and the natural language command is lower than a preset matching threshold, triggering an error correction process;

querying the knowledge graph database according to operation error information to obtain error API node information, the error API node information includes but is not limited to API explanation information, sample error code, sample error code meaning and sample error code optimization suggestion;

generating a first correction control code according to the error API node information and the initial control code; and re-executing the first correction control code and updating the first verification result.

In an embodiment, after the generating the second verification result, the method further includes:

in response to user's interactive adjustment instructions for the three-dimensional simulation model, updating the natural language command; and regenerating the second correction control code according to the updated natural language command, and iteratively performing the multi-level virtual operation verification according to the second correction code.

In an embodiment, the generating the third verification result according to the motion process data includes:

dividing the motion process data into multiple verification intervals according to a preset time stage; and in each verification interval, comparing, by the user, a real-time parameter with an expected value of the corresponding stage to generate the third verification result.

In an embodiment, the software motion control system further includes a real-time motion engine, and after the performing the multi-level virtual operation verification on the initial control code in the software motion control system, and generating the target control code according to the multi-level verification results confirmed multiple times by the user and the initial control code, the method further includes:

in response to user's execution decision, synchronizing runtime environment configuration of the simulation motion engine to the real-time motion engine, wherein after the configuration synchronization, axis numbers of the simulation motion engine and the real-time motion engine correspond one to one, and the simulation motion engine and the real-time motion engine use same motion control function library; and sending the control code to the real-time motion engine to periodically control an automated device based on the target control code through the real-time motion engine.

Besides, in order to achieve the above objective, the present application further provides an apparatus for automated control code generation and verification, including:

an interaction module configured for receiving a natural language command, wherein the natural language command is configured to instruct the large language model to output a code text that meets control requirements corresponding to the natural language command;

a code positioning module configured for performing matching retrieval on a vector database according to the natural language command to obtain a sample code snippet;

a relation acquisition module configured for obtaining API structured information corresponding to the sample code snippet from a knowledge graph database;

a code generation module configured for generating an initial control code according to the sample code snippet and the API structured information; and a code execution module configured for performing a multi-level virtual operation verification on the initial control code in a software motion control system, and generating a target control code according to multi-level verification results confirmed multiple times by the user and the initial control code.

Besides, in order to achieve the above objective, present application further provides a device for automated control code generation and verification, including: a memory, a processor, and a program for automated control code generation and verification stored in the memory and executable on the processor, the program for automated control code generation and verification is configured to implement the steps of the method for automated control code generation and verification as described above;

the device further includes a software motion control system, and the software motion control system includes a simulation motion engine and a real-time motion engine.

Besides, in order to achieve the above objective, the present application further provides a computer-readable storage medium, a program for automated control code generation and verification is stored on the computer-readable storage medium, and when the program for automated control code generation and verification is executed by a processor, the steps of the method for automated control code generation and verification as described above are implemented.

The present application provides a method, an apparatus and a device for automated control code generation and verification, and a storage medium. The method is applied to a large language model, including: receiving a natural language command, the natural language command being configured to instruct the large language model to output a code text that meets control requirements corresponding to the natural language command; performing matching retrieval on a vector database according to the natural language command to obtain a sample code snippet; obtaining API structured information corresponding to the sample code snippet from a knowledge graph database; generating an initial control code according to the sample code snippet and the API structured information; and performing a multi-level virtual operation verification on the initial control code in a software motion control system, and generating a target control code according to multi-level verification results confirmed multiple times by the user and the initial control code.

In the present application, based on the large language model, dual database retrieval can be performed to obtain the sample code snippet and API structured information related to natural language command control requirements, automatically generate accurate and logical initial control codes, and perform multi-level code verification on the initial control code through the software motion control system, and quickly generate highly reliable automated control codes that meet user needs in combination with the multi-level verification results confirmed by the user multiple times. Compared with the related art, the present application can automatically generate and verify the automated control code through a large language model, which not only improves the code generation efficiency, reduces the error rate, but also enhances the maintainability of the code. At the same time, the present application effectively avoids the potential risks that may be caused by full automation by introducing multi-level virtual verification combined with user judgment and decision-making steps, while enhancing the user's trust in the generated code and the execution effect, and ensuring the reliability and applicability of the final code, solving the shortcomings of the related art in terms of generation speed and security, and providing a more efficient and reliable automated control code generation method.

BRIEF DESCRIPTION OF THE DRAWINGS

The drawings herein are incorporated into the specification and constitute a part of the specification, showing embodiments consistent with the present application, and together with the specification, are used to explain the principles of the present application.

In order to more clearly illustrate the technical solutions in the embodiments of the present application or the related art, the drawings required for the embodiments or the related art description will be briefly introduced below. Obviously, for ordinary technicians in the art, other drawings can be obtained based on these drawings without creative labor.

Figure 1:
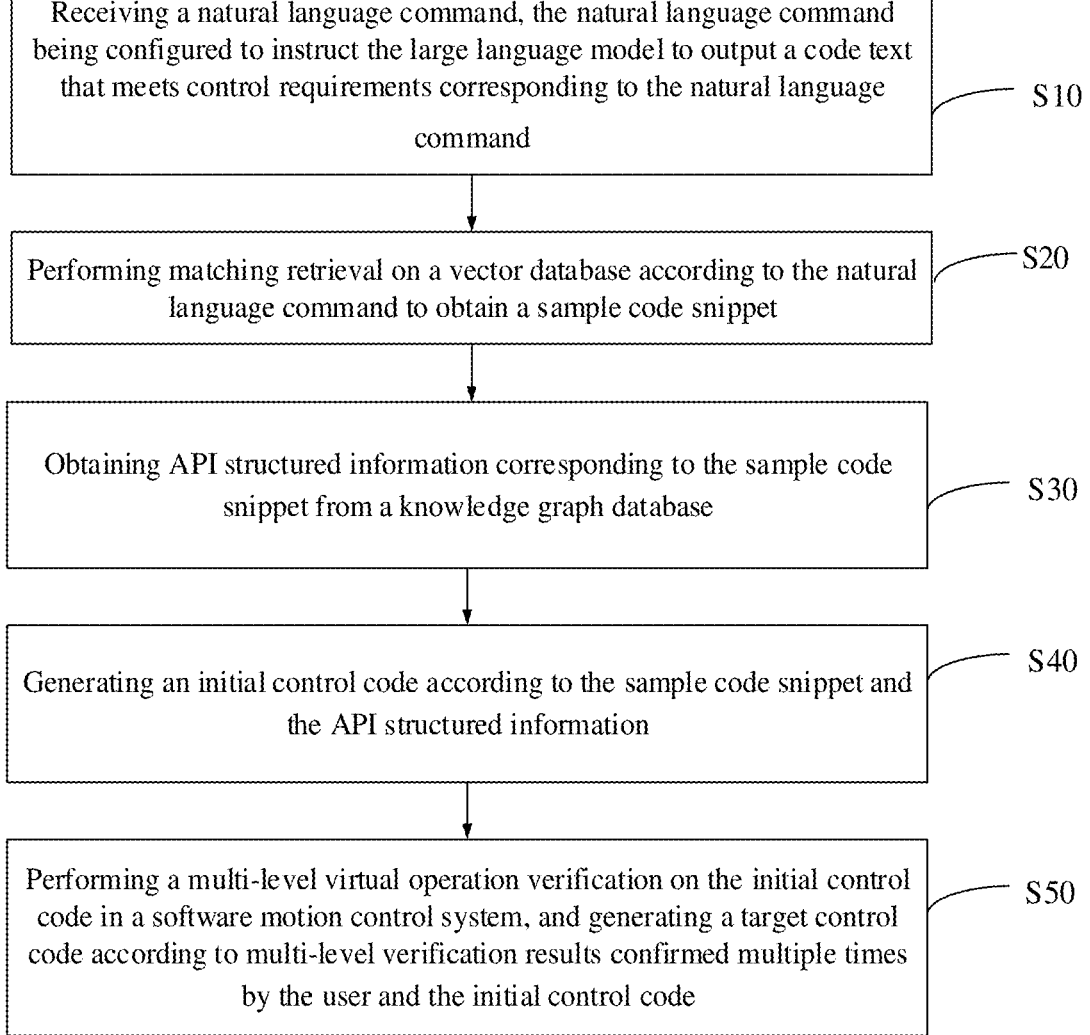

FIG. 1 is a flowchart of a method for automated control code generation and verification according to an embodiment of the present application.

Figure 2:
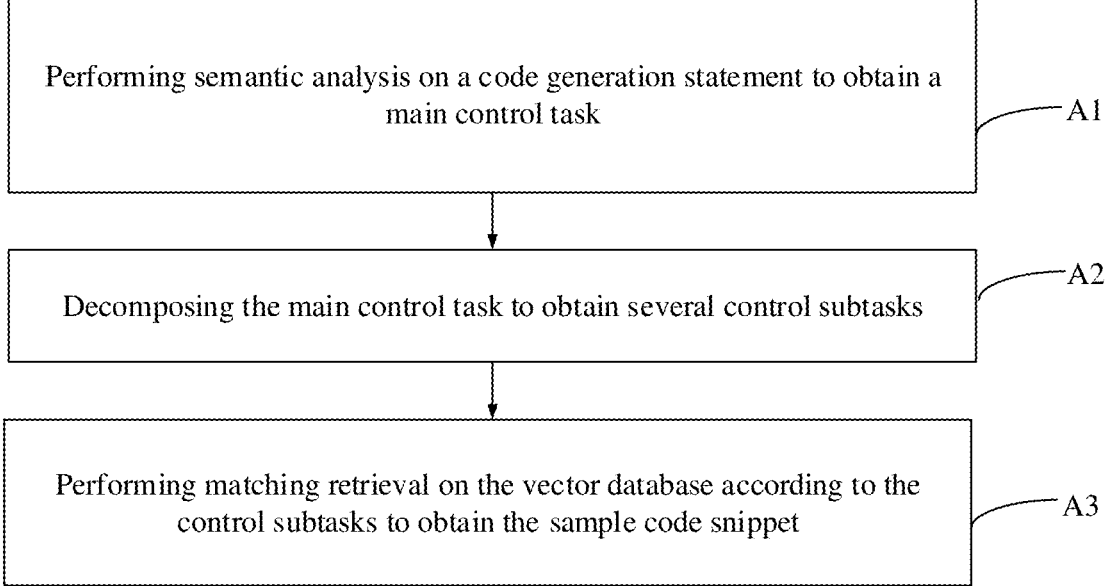

FIG. 2 is a flowchart of the method for automated control code generation and verification according to another embodiment of the present application.

FIG. 3 is a flowchart of the method for automated control code generation and verification according to another embodiment of the present application.

FIG. 4 is a flowchart of the method for automated control code generation and verification according to another embodiment of the present application.

FIG. 5 is a flowchart of the method for automated control code generation and verification according to another embodiment of the present application.

FIG. 6 is a flowchart of the method for automated control code generation and verification according to another embodiment of the present application.

FIG. 7 is a flowchart of the method for automated control code generation and verification according to another embodiment of the present application.

Figure 8:
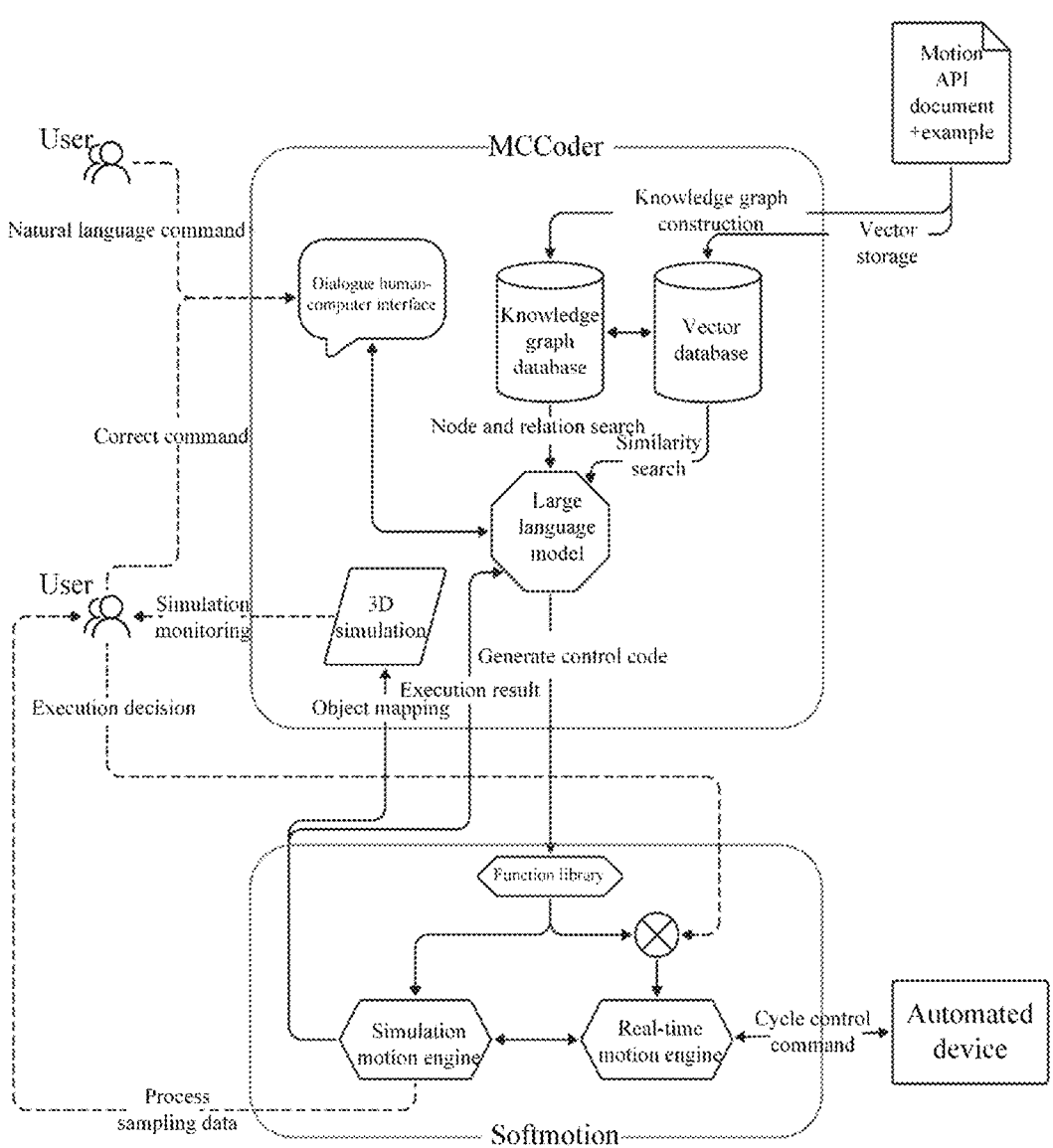

FIG. 8 is a structural control block diagram of the method for automated control code generation and verification according to another embodiment of the present application.

Figure 9:
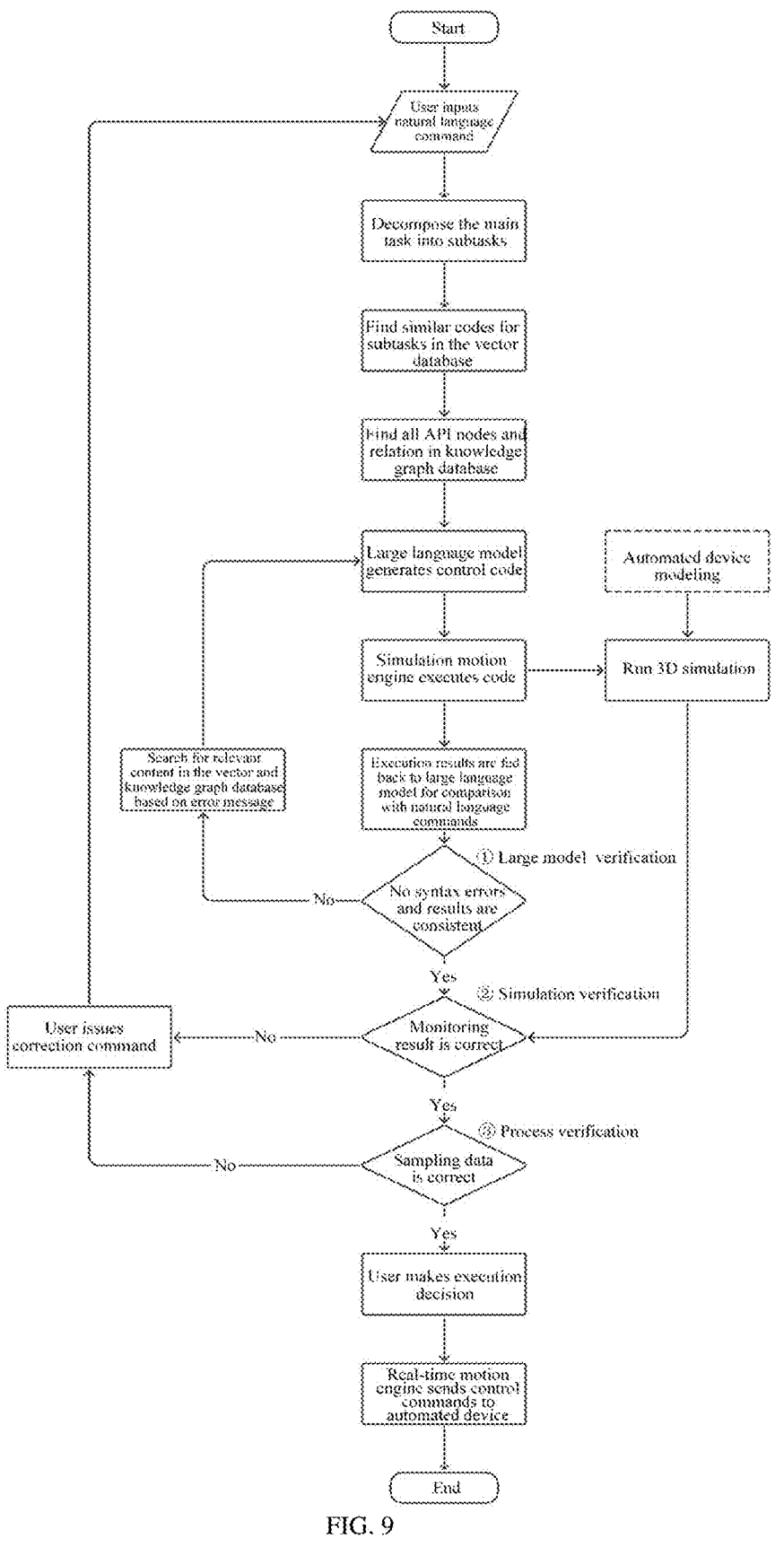

FIG. 9 is a brief flowchart of the method for automated control code generation and verification of the present application.

Figure 10:
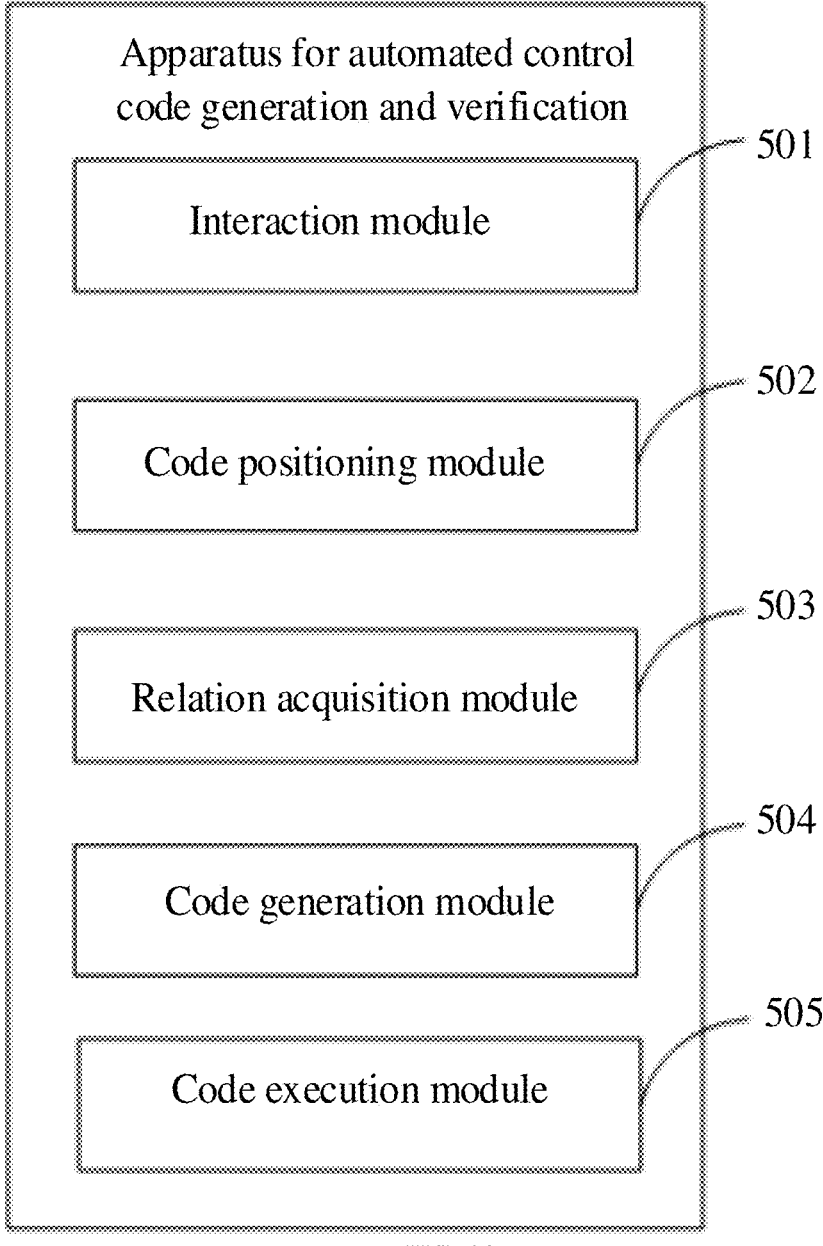

FIG. 10 is a structure diagram of modules of an apparatus for automated control code generation and verification according to an embodiment of the present application.

Figure 11:
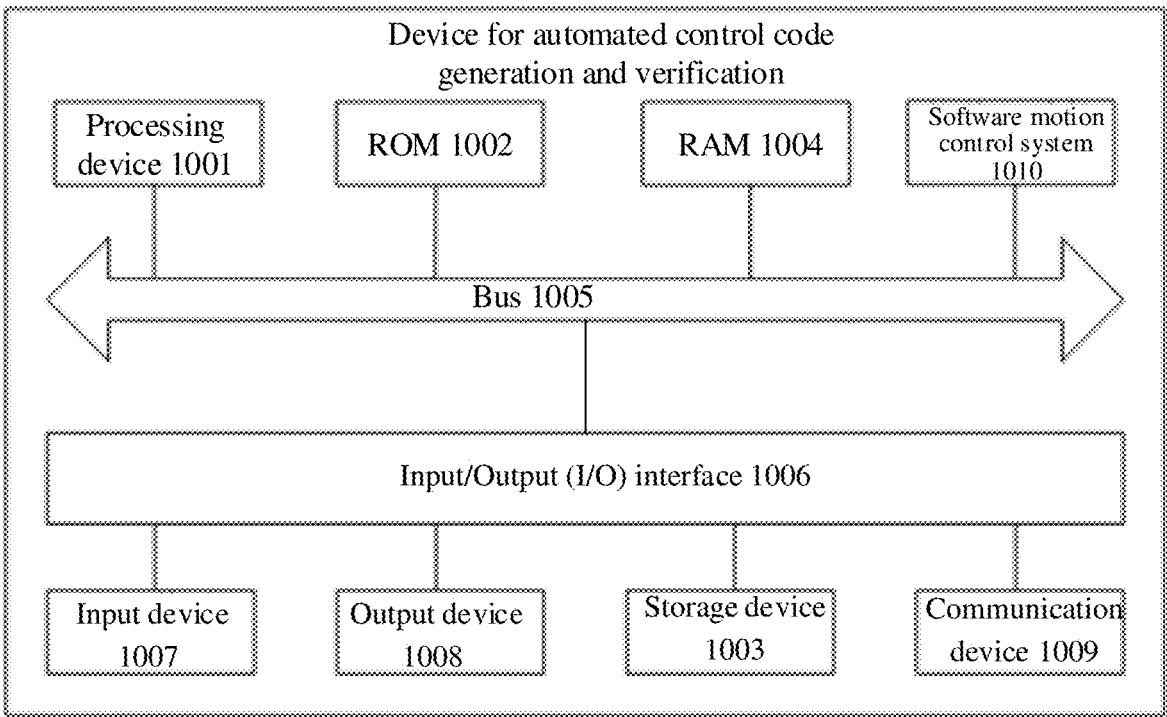

FIG. 11 is a device structure diagram of the hardware operating environment involved in the method for automated control code generation and verification according to an embodiment of the present application.

The purpose, functional features and advantages of the present application will be further explained in conjunction with the embodiments and with reference to the accompanying drawings.

DETAILED DESCRIPTION OF THE EMBODIMENTS

It should be understood that the specific embodiments described herein are only to explain the technical solution of the present application and are not to limit the present application.

In order to better understand the technical solution of the present application, the following will be described in detail in conjunction with the drawings and specific implementation methods of the specification.

The main solution of the present application is: receiving a natural language command, the natural language command being configured to instruct the large language model to output a code text that meets control requirements corresponding to the natural language command; performing matching retrieval on a vector database according to the natural language command to obtain a sample code snippet; obtaining API structured information corresponding to the sample code snippet from a knowledge graph database; generating an initial control code according to the sample code snippet and the API structured information; and performing a multi-level virtual operation verification on the initial control code in a software motion control system, and generating a target control code according to multi-level verification results confirmed multiple times by the user and the initial control code.

The current automated control system programming methods mainly include manual programming and templated programming, which have the following problems.

Firstly, manual programming usually uses PLC language or high-level programming language (such as Python, C++, C#, etc.). Although high-level languages have high flexibility and functionality, their programming complexity is high and requires engineers' professional knowledge. In order to meet the high security requirements of the system, engineers tend to write code manually to ensure reliability. However, this method is not only inefficient and has a long development cycle, but also prone to code quality problems due to human errors, and lacks flexibility when facing changes in requirements. Templated programming reduces programming difficulty and improves development efficiency through predefined code templates, but its template design is usually difficult to cope with complex scenarios or personalized needs, and it is easy to cause rigid code structure, limiting the adaptability and scalability of the system. Therefore, whether it is manual programming or templated programming, it is difficult to balance complexity and security, and more advanced programming methods are urgently needed to break through these bottlenecks.

Secondly, in the field of motion control, many dedicated motion control function libraries contain thousands of API functions, and the parameter settings of each API are complex, which greatly increases the learning cost and difficulty of use. Engineers need to spend a lot of time to learn and understand these APIs, and it is often difficult to make flexible adjustments according to specific scenarios. This makes traditional manual and automatic programming tools difficult to be widely used and inefficient.

Lastly, after the initial generation of the automated control code, it still needs to be tested repeatedly to ensure that the code works with the hardware. In the control execution and optimization process of electrical and mechanical components, it is often necessary to gradually adjust the parameters and conduct multiple tests to ensure the optimal motion performance while eliminating potential safety hazards. The debugging process is time-consuming, cumbersome, and prone to errors. However, the control code can only be run on the physical device after debugging to ensure that the code parameters are safe and correct.

In order to solve the above problem, the present application attempts to combine a large language model to intelligently generate the automated control code. Specifically, the present application first obtains the natural language command that describes the control requirements of the user through natural language input, and then intelligently parses the natural language command input by the user, and retrieves the vector database according to the parsing results to obtain similar codes corresponding to the tasks of the natural language command, that is, the sample code snippet and the complete information support associated with the sample code snippet obtained through the knowledge graph database, that is, API structured information, which may include API definitions, parameter interpretations, call constraints, and reference relationships in documents, etc. Then the large language model forms a global understanding of the control task corresponding to the natural language command based on the sample code snippet and API structured information, and generates the initial control code. Finally, the present application performs multi-level code verification on the initial control code through the software motion control system, and quickly generates a highly reliable automated control code that meets the user's needs in combination with the multi-level verification results confirmed by the user for multiple times.

Compared with the related art, the present application can automatically generate and verify automated control codes through a large language model, which not only improves the efficiency of code generation, reduces the error rate, but also enhances the maintainability of the code. At the same time, the present application effectively avoids the potential risks that may be caused by full automation by introducing multi-level virtual verification that combines user judgment and decision-making steps, while enhancing the user's trust in the generated code and the execution effect, and ensuring the reliability and applicability of the final code, solving the shortcomings of the existing technology in terms of generation speed and security, and providing a more efficient and reliable method for automated control code generation.

It should be noted that the execution subject of this embodiment may be a system for automated control code generation and verification, or a computing service device with data processing, network communication and program running functions and pre-installed with a large language model (LLM), such as a tablet computer, a personal computer, a mobile phone, etc., or a device for automated control code generation and verification capable of realizing the above functions, etc., which is not specifically limited in this embodiment. The following takes the device for automated control code generation and verification (referred to as the generation and verification device) as the execution subject as an example to illustrate this embodiment and the following embodiments.

Based on this, the present application provides a method for automated control code generation and verification. As shown in FIG. 1, FIG. 1 is a flowchart of a method for automated control code generation and verification according to an embodiment of the present application.

In this embodiment, the method for automated control code generation and verification is applied to a large language model. The method includes steps S10 to S50.

Step S10, receiving a natural language command, the natural language command being configured to instruct the large language model to output a code text that meets control requirements corresponding to the natural language command.

It should be understood that existing automated control code developers spend too much time on debugging, document review and architecture design when manually generating code. Templated code relies on fixed rules and is difficult to handle complex scenarios (such as nested exception handling and multi-threaded collaboration). In order to effectively improve the efficiency of automated control code generation, this embodiment attempts to combine a large language model to achieve intelligent generation of automated control code through semantic understanding and knowledge reasoning, breaking through the boundaries of static rules. Therefore, the above-mentioned natural language command can be a natural language format input by the user to the large language model dialogue human-computer interface, representing the command statement of its automated control requirements, which can be input into the large language model to instruct the large language model to output code text that meets the control requirements corresponding to the natural language command.

Therefore, this embodiment can subsequently perform intelligent analysis on the natural language commands input by the user through a large language model, and obtain similar codes related to the control requirements corresponding to the natural language commands based on the analysis results.

Step S20, performing matching retrieval on a vector database according to the natural language command to obtain a sample code snippet.

It is easy to understand that in this embodiment, the motion API documents corresponding to different motion control functions can be parsed in advance, and the sample codes in the motion API documents can be divided into independent code snippets. After the function description and code content of each code snippet are extracted, the vectorization technology is used to store it in the vector database to form a highly searchable semantic structure. Therefore, in actual application, the code snippets related to natural language commands can be quickly retrieved according to user needs, thereby improving the efficiency of code snippet positioning and reducing the search time, especially when processing a large number of code snippets.

In an embodiment, as shown in FIG. 2, the step S20 includes steps A1 to A3.

Step A1, performing semantic analysis on a code generation statement to obtain a main control task;

Step A2, decomposing the main control task to obtain several control subtasks; and Step A3, performing matching retrieval on the vector database according to the control subtasks to obtain the sample code snippet.

It should be understood that in order to quickly and accurately locate similar codes related to control requirements corresponding to natural language commands, this embodiment can combine the natural language parsing ability of the large language model to perform semantic parsing on the code generation statement, obtain the corresponding control main task, and then automatically decompose the complex control main task into several logically clear control subtasks; finally, based on each control subtask, the sample code fragments related to the natural language command control requirements are accurately located from the vector database to improve the high flexibility and adaptability of the code generation method, so that the technical solution proposed in this embodiment can be applied to complex scenarios of multi-module collaboration.

In an embodiment, assume that the received natural language command is: "Move axis 0 and axis 1 to positions 100 and 150 at a speed of 100 and an S-shaped acceleration of 1000, and set the input signal I0.2 to 1, and then perform spline interpolation on axis 2 and axis 3 to positions 200 and 300". At this time, this embodiment can first parse the user's natural language command through a large language model, and decompose the main control task into the following three control subtasks: 1) Control axis 0 and axis 1 to move to the target position at a speed of 100 and an S-shaped acceleration of 1000; 2) Set the input signal I0.2 to 1; 3) Control axis 2 and axis 3 to perform spline interpolation to the target position.

Then, this embodiment can retrieve the code snippet with the highest semantic similarity to each subtask from the pre-built vector database, and return the codes C1, C2, C3, C4, C5, C6, etc. related to the above three control subtasks. The codes C1~C6 obtained at this time together constitute the above example code snippet.

Step S30, obtaining API structured information corresponding to the sample code snippet from a knowledge graph database.

Step S40, generating an initial control code according to the sample code snippet and the API structured information.

It should be noted that, unlike the code combination generation in other scenarios, the parameter combinations of the motion control field codes are too complicated, and slight parameter changes will also lead to huge changes in the motion control results. Therefore, after determining the sample code snippet, the reasonable setting of the function parameters in the sample code snippet and the effective sorting combination of the sample code snippet are very complicated.

Therefore, in the process of pre-parsing the motion API documents of each motion control function, this embodiment can also summarize the system installation guide, programming tutorial, and API definition, variables, function names and function explanations into a knowledge graph database for the large language model to learn. For API parameters, such as acceleration and deceleration types, the definitions of these parameters are usually also stored in the pre-stored motion API documents, with complex graphic explanations. The knowledge graph database can establish a reference relationship between these related chapter contents and each API function. This database construction method enables users and large language models to clearly understand the dependencies and reference logic between APIs through the knowledge graph, especially in complex scenarios involving cross-references of multiple documents, thereby ensuring the safe and effective call of automated motion control.

It is understandable that after obtaining the sample code snippet from the vector database, this embodiment can also obtain its associated complete information support from the knowledge graph database, that is, the above-mentioned API structured information. The API structured information may include the API definition, parameter explanation, call constraints corresponding to the sample code snippet, and reference relationships with other nodes in the document, such as the definition of various acceleration and deceleration types, overloaded versions of functions, and usage scenarios.

It should be understood that in this embodiment, there is a mutual mapping relationship between the vector database and the knowledge graph database. During the process of building the knowledge graph database, each API in each code snippet can be regarded as an independent node, and its attributes include API definition, parameter type, function description and call constraints, etc. Each code snippet of the sample code in the vector database can be directly associated with the API and related parameters used by it as a node, thereby forming a complete call link, so that the large language model can perform joint retrieval between the two and realize the rapid generation of initial control code.

In an embodiment, the steps of building the knowledge graph database may be: parsing the motion control API document into independent nodes, each node containing API definition, parameter type and calling constraints; establishing a hierarchical relationship between API nodes, including overloaded version associations, parameter dependency references and sample code calling links; bidirectionally mapping the hierarchical relationship with the semantic vectors in the vector database to form a joint retrieval index.

Therefore, this embodiment can associate different control nodes through the knowledge graph database, and support the flexible splicing of complex functional modules based on the dynamic combination capability of the knowledge graph database, so that the system can cope with diverse programming requirements (such as cross-language, multi-platform), without the need to redesign algorithms for specific scenarios. In addition, unified knowledge graph specifications and verification standards can enforce coding best practices and ensure project maintainability.

It is understandable that after obtaining the sample code snippets and their corresponding API structured information, the large language model can form a global understanding of the above-mentioned control main task based on these comprehensive information, so as to quickly generate a more accurate complete control code, that is, the above-mentioned initial control code, and ensure that the code logic and practicality of the initial control code are much higher than the traditional generation method based on single similarity semantic search. Through this process, the large language model can fully understand the context and details of each control subtask, and combine the sample code of the vector database with the API node information in the knowledge graph database to ensure that the generated initial control code contains both the logical implementation of user requirements and the compliance with the rules and call constraints of the API.

In summary, this embodiment provides the system with powerful retrieval and structured analysis capabilities through the combination of vector database and knowledge graph database. The vector database is responsible for efficient semantic query, while the knowledge graph provides hierarchical logical dependency analysis, which makes up for the shortcomings of semantic retrieval in complex scenarios. Especially in the field of motion control, this dual database architecture solves the core problems of document complexity and information relevance, and provides users with transparent and efficient technical support. In addition, this embodiment designs a dynamic update mechanism for the vector database and the knowledge graph database, which can be continuously improved with the expansion of document content and changes in user needs, thereby ensuring long-term applicability and efficiency. This architecture not only improves the efficiency of document management and code generation, but also provides a solid technical foundation for the decomposition and implementation of complex tasks.

Step S50, performing a multi-level virtual operation verification on the initial control code in a software motion control system, and generating a target control code according to multi-level verification results confirmed multiple times by the user and the initial control code.

It should be understood that in order to ensure the reliability of the motion control code, this embodiment can perform multi-level virtual operation verification on the initial control code through the software operation control system after the large language model automatically generates the initial control code. The software motion control system is pre-loaded in the generation and verification device, which can convert an ordinary PC into a real-time system, and does not require a special control chip, but runs on the general CPU of the PC. The software motion control system has a high degree of modularity, powerful available computing power, and high execution efficiency. It can be seamlessly combined with the large language model of AI to quickly run and verify the control code it generates, and perform process sampling and feedback execution results in real time, which has advantages that hardware controllers do not have. Therefore, this embodiment can perform multi-level virtual operation verification through the software operation control system to detect whether the initial control code has code logic conflicts, syntax errors and security risks, thereby reducing code defects caused by human negligence and improving code reliability. Besides, the verification results at all levels can be confirmed by the user, and finally the target control code that meets the user's control requirements is generated based on the multi-level verification results and the initial control code confirmed by the user for multiple times, avoiding the potential risks that may be caused by full automation, while enhancing the user's trust in the generated code and its execution effect, and ensuring the reliability and applicability of the final code.

In summary, this embodiment first obtains the natural language commands input by the user through the dialogue human-computer interface, and the large language model can perform semantic analysis based on the natural language commands to obtain the main control task, and decompose the main control task into multiple control subtasks.

Meanwhile, this embodiment can construct a vector database and a knowledge graph database for complex API documents and codes in the field of motion control in advance. The vector database stores the function definition, parameter description and sample code in the API document through semantic vectorization, which is used to efficiently retrieve code snippets with semantic similarity to the user input instructions. The knowledge graph database stores the structured information of the API corresponding to each code snippet in the form of nodes and relationships, including the overloaded version of the function, parameter dependency, call constraints and cross-document reference relationships.

Therefore, when the vector database returns sample code snippets related to the natural language command task, the knowledge graph database can further analyze the API structured information involved in the sample code snippets, such as the definition of parameter types, overloaded versions of functions, and call dependencies, so that the large language model can automatically generate initial control codes based on the sample code snippets and API structured information. This automatic code generation method, which provides both fast retrieval functions and in-depth analysis of complex dependencies between APIs, not only supports comprehensive analysis of complex API scenarios, but also provides more accurate context support for the large language model, thereby significantly improving the accuracy and logic of generated control codes.

Finally, this embodiment combines the software motion control system to perform multi-level virtual operation verification on the initial control code, and generates an accurate and correct target control code by combining the initial control code and the multi-level verification results confirmed by the user for multiple times.

Therefore, in this embodiment, during the process of realizing intelligent generation of automated control codes based on a large language model, sample code snippets related to the natural language command control requirements input by the user can be queried from the vector database, and the nodes and relationships of all relevant motion control APIs of the sample code snippets can be searched from the knowledge graph database as a reference. Then, the large language model automatically generates the corresponding initial control code based on the user's natural language commands, the sample code snippets retrieved, and the knowledge graph nodes and relationship data. Finally, the initial control code is verified at multiple levels through the software motion control system, and combined with the multi-level verification results confirmed by the user multiple times, a highly reliable automation control code that meets the user's needs is quickly generated. Compared with the related art, this embodiment can automatically generate and verify the automated control code through a large language model, which not only improves the code generation efficiency, reduces the error rate, but also enhances the adaptability and maintainability of the code. At the same time, this embodiment effectively avoids the potential risks that may be caused by full automation by introducing multi-level virtual verification combined with user judgment and decision-making steps, while enhancing the user's trust in the generated code and its execution effect, and ensuring the reliability and applicability of the final code, solving the shortcomings of the existing technology in terms of generation speed and security, and providing a more efficient and reliable method for automated control code generation.

The present application provides a method for automated control code generation and verification, including: receiving a natural language command, the natural language command being configured to instruct the large language model to output a code text that meets control requirements corresponding to the natural language command; performing matching retrieval on a vector database according to the natural language command to obtain a sample code snippet; obtaining API structured information corresponding to the sample code snippet from a knowledge graph database; generating an initial control code according to the sample code snippet and the API structured information; and performing a multi-level virtual operation verification on the initial control code in a software motion control system, and generating a target control code according to multi-level verification results confirmed multiple times by the user and the initial control code. In this embodiment, during the process of realizing intelligent generation of automated control codes based on a large language model, sample code snippets related to the natural language command control requirements input by the user can be queried from the vector database, and the nodes and relationships of all relevant motion control APIs of the sample code snippets can be searched from the knowledge graph database as a reference. Then, the large language model automatically generates the corresponding initial control code based on the user's natural language commands, the sample code snippets retrieved, and the knowledge graph nodes and relationship data. Finally, the initial control code is verified at multiple levels through the software motion control system, and combined with the multi-level verification results confirmed by the user multiple times, a highly reliable automation control code that meets the user's needs is quickly generated. Compared with the related art, this embodiment can automatically generate and verify the automated control code through a large language model, which not only improves the code generation efficiency, reduces the error rate, but also enhances the adaptability and maintainability of the code. At the same time, this embodiment effectively avoids the potential risks that may be caused by full automation by introducing multi-level virtual verification combined with user judgment and decision-making steps, while enhancing the user's trust in the generated code and its execution effect, and ensuring the reliability and applicability of the final code, solving the shortcomings of the existing technology in terms of generation speed and security, and providing a more efficient and reliable method for automated control code generation.

Based on the above embodiment, in another embodiment of the present application, for the same or similar contents as those of the above embodiment, please refer to the above introduction and will not be described in detail later.

As shown in FIG. 3, FIG. 3 is a flowchart of the method for automated control code generation and verification according to another embodiment of the present application. The software motion control system includes a simulation motion engine; in this embodiment, step S50 may include steps B1 to B4.

Step B1, transmitting the initial control code to the simulation motion engine for device simulation operation to obtain a code execution result, and semantically matching the code execution result with the natural language command to generate a first verification result.

It should be noted that normally, the control code needs to be actually run in the hardware motion controller before its effect can be verified, which often requires a lot of time and hardware resources, and there is a risk of equipment damage or potential safety hazards caused by the debugging process. In order to ensure the security of the initial control code, the present embodiment introduces a simulation motion engine so that the generated initial control code can be run and verified in a virtual environment. The simulation motion engine can run on a dedicated CPU core (Windows and other programs run on other CPU cores). The simulation motion engine can provide accurate simulation results in operation and generate feedback information for the large language model to judge and correct errors in the code.

Therefore, this embodiment can transmit the initial control code to the simulation motion engine for execution. The simulation motion engine simulates the operation process of the automated device under the action of the initial control code, that is, performs the above-mentioned device simulation operation, and then records the code execution results corresponding to the device simulation operation, including key data such as the position, speed, and I/O feedback of the control axis.

It can be understood that after obtaining the code execution result, the execution result can be compared with the user's original natural language command to perform preliminary code verification, and determine whether the initial control code can be used as the target control code for the final operation based on the virtual operation comparison result corresponding to the preliminary verification. The comparison method can be to feed back the execution result to the large language model and the user's natural language command for semantic matching, obtain the current semantic matching degree, and then determine the first verification result based on the current semantic matching degree.

In an embodiment, as shown in FIG. 4, the step B1 includes steps B11 to B14.

Step B11, in response to that a semantic matching degree between an operation result and the natural language command is lower than a preset matching threshold, triggering an error correction process;

Step B12, querying the knowledge graph database according to operation error information to obtain error API node information, the error API node information includes but is not limited to API explanation information, sample error code, sample error code meaning and sample error code optimization suggestion;

Step B13, generating a first correction control code according to the error API node information and the initial control code; and Step B14, re-executing the first correction control code and updating the first verification result.

It is understandable that after the large language model compares the code execution results and natural language commands, if problems are found, such as the code execution results do not match the target position required by the user (for example, the target position is 300, and the actual result is 200), or there are grammatical errors in the generated code, the current semantic matching degree is lower than the preset matching degree, then the first verification result corresponding to the virtual operation comparison result may be that the large model verification failed, and may trigger an error correction process for automatic code correction in combination with the knowledge graph database.

At this time, the code snippet corresponding to the syntax error code or the error execution result determined from the virtual operation comparison result, that is, the above-mentioned operation error information, can be first determined. Then the operation error information is fed back to the knowledge graph database to query relevant correction information, such as detailed explanation information of the API, sample error code, sample error code meaning and sample error code optimization suggestions, and the relevant correction information is passed to the large language model so that the large language model can quickly correct the initial control code based on the error API node information and re-verify based on the corrected first correction control code. Through this feedback mechanism, this embodiment can realize dynamic correction and optimization of the initial control code that has not been verified by the simulation motion engine until the generated code can be correctly executed and meet user needs, thereby gradually improving the accuracy and task adaptability of the code.

Step B2, after the user confirms the first verification result, driving a three-dimensional simulation model through the simulation motion engine to display a device motion process corresponding to the initial control code, and generating a second verification result, so that the user visually observes whether a device action corresponding to the initial control code in the three-dimensional simulation model meets the control requirements through the second verification result.

It is easy to understand that if the user observes that the current semantic matching degree is not lower than the preset matching degree, the first verification result corresponding to the virtual operation comparison can be the large model verification passed. After the user confirms that the operation result of the simulation motion engine is correct, further simulation verification can be performed to improve the code reliability. At this time, this embodiment can also drive the three-dimensional simulation model corresponding to the automated device through the simulation motion engine to display the movement process corresponding to the initial control code, so that the user can intuitively observe whether the simulation operation action of the automated device meets the expected control requirements through the three-dimensional simulation model, and perform further simulation verification.

In an embodiment, through object mapping, physical objects such as virtual control axes and IO can be mapped to virtual axes and virtual devices in the 3D simulation model, and 3D execution results that present the motion process of virtual axes and virtual devices in real time can be generated. For example, the axis numbers of the simulation motion engine can be mapped to the virtual axes in the 3D simulation model starting from axis 100, axis 101, and axis 102, so that the simulation motion engine can control the corresponding 3D simulation model during operation. Therefore, the 3D simulation model can reflect the effect of code execution in real time, including the position, speed, motion trajectory, etc. of the axis, and present it in a 3D visualization way.

In an embodiment, as shown in FIG. 5, after the step B2, the method includes steps B21 to B22.

Step B21, in response to user's interactive adjustment instructions for the three-dimensional simulation model, updating the natural language command; and Step B22, regenerating the second correction control code according to the updated natural language command, and iteratively performing the multi-level virtual operation verification according to the second correction code.

It is easy to understand that when the user observes that the device action does not meet the control requirements through the three-dimensional simulation model, the problem in the code can be quickly identified and interactive adjustment instructions can be fed back. The interactive adjustment instructions can include instruction adjustment or improvement requirements. After the large language model analyzes the interactive adjustment instructions, it can trigger the optimization of the natural language instructions, and then generate a new second correction control code based on the optimized and updated natural language commands, and then re-perform multi-level virtual operation verification based on the updated second correction code, thereby further improving the high reliability of the code generation process.

In this embodiment, by using the object mapping technology that combines the simulation motion engine with 3D simulation, the motion process executed by the generated control code is presented to the user in a dynamic and visual way. Combined with further simulation verification, the user can intuitively observe whether the device action under the initial control code meets the requirements through 3D simulation, and verify the correctness of the generated code in advance, so as to quickly identify problems in the code and optimize it. This dynamic visualization method significantly improves the transparency of the control code generation and verification process, allowing users to adjust and optimize the generated code more efficiently, thereby improving development efficiency and the accuracy of results.

Step B3, after the user confirms the second verification result, periodically collecting motion process data of the simulation motion engine during operation, and generating a third verification result according to the motion process data, the motion process data including but is not limited to position, speed, current feedback and IO status of a control axis.

Step B4, after the user confirms the third verification result, using the control code finally confirmed by the user as the target control code.

It is easy to understand that if the simulation results displayed by the three-dimensional simulation model meet the user's control requirements, after the user confirms the second verification result, the generation and verification device can also perform more detailed process verification. At this time, this embodiment can periodically sample the execution process of the simulation motion engine to obtain dynamic information such as the actual position, speed, current feedback, I/O status, etc. of each control axis when the simulation motion engine runs based on the initial control code, that is, the above-mentioned motion process data is provided for the user to determine whether the overall requirements are met. At this time, the trajectory and end point of the code execution can be further verified based on the comparison of the preset stage operation data and the motion process data to generate a third verification result.

In an embodiment, as shown in FIG. 6, the step B3 includes steps B31 to B32.

Step B31, dividing the motion process data into multiple verification intervals according to a preset time stage; and Step B32, in each verification interval, comparing, by the user, a real-time parameter with an expected value of the corresponding stage to generate the third verification result. It should be understood that in order to perform a detailed code operation comparison, this embodiment may divide the collected motion process data into multiple verification intervals according to time stages, each verification interval may include corresponding real-time motion parameters, and the real-time motion parameters may be displayed to the user according to different verification intervals for comparison and verification, so that the user can verify whether the trajectory and end point of the code execution are consistent with expectations based on these data. If there is a problem, the natural language command is corrected, and the generation and verification device can regenerate the control code and perform multi-level virtual operation verification again.

For example, the user can compare the displayed real-time parameters with the expected values of the corresponding stage in each verification interval, and generate a third verification result based on the comparison result. It can be understood that at this time, if the user finds that the difference between the real-time parameters and the corresponding expected values in any verification interval exceeds the safety threshold, it can be determined that the preset stage operation data and the motion process data are inconsistent, and the third verification result is that the process verification fails, and the code iteration process based on the user correction instruction is triggered. If the difference between the real-time parameters and the corresponding expected values in all verification intervals meets the safety threshold, the third verification result can be determined as the process verification passes.

At this time, the above code iteration process can be to trigger a user alarm and suspend subsequent code deployment, while waiting for the user to input an adjusted and optimized natural language command based on the third verification result, and then further optimize the initial control code based on the adjusted and optimized natural language command until the optimized control code can be verified by the above process data. This process verification method significantly improves the accuracy of problem diagnosis, enabling users to scientifically adjust control strategies, thereby effectively optimizing the code generation process. At the same time, this mechanism further enhances the transparency and explainability of the code generation system.

It is understandable that when the initial control code is subjected to the above-mentioned large model verification, simulation verification and process verification in sequence, and the verification results at each level are confirmed under real-time supervision and intervention by the user, this embodiment can use the latest control code corresponding to the third verification result finally confirmed by the user as the final target control code.

In an embodiment, as shown in FIG. 7, the software motion control system further includes a real-time motion engine, and after the step S50, the method further includes:

Step S60, in response to user's execution decision, synchronizing runtime environment configuration of the simulation motion engine to the real-time motion engine, wherein after the configuration synchronization, axis numbers of the simulation motion engine and the real-time motion engine correspond one to one, and the simulation motion engine and the real-time motion engine use same motion control function library; and Step S70, sending the control code to the real-time motion engine to periodically control an automated device based on the target control code through the real-time motion engine.

It is easy to understand that in this embodiment, after confirming that the control code generated by the large language model has passed the above-mentioned large model verification, process verification and simulation verification, the user can make an execution decision based on the target control code verified by multi-level virtual operation. For ease of understanding, an example is given with reference to FIG. 8, which is a structural control block diagram of the method for automated control code generation and verification of the present application. As shown in FIG. 8, after the initial control code passes the multi-level verification, the user can decide whether to deploy the control code to the actual device.

When the user inputs the execution decision of the deployment, the target control code generated by Motion Control Coder (MCCoder) that has passed multi-level verification and user confirmation can be transferred from the simulation motion engine in the software motion control system (such as Softmotion in FIG. 8) to the real-time motion control engine, which can also run on a dedicated CPU core. At this time, this embodiment can periodically send the target control code to the real-time motion engine to periodically control the automated device based on the target control code through the real-time motion engine.

It should be noted that before performing code transfer, this embodiment can synchronize the runtime environment configuration of the simulation motion engine to the real-time motion engine, thereby ensuring the consistency between the simulation motion engine and the real-time motion engine, ensuring that the results of the code execution of the two are completely consistent at the logical level, and further ensuring that the simulation results generated by the simulation motion engine can be directly migrated to the actual device, greatly reducing the errors caused by the inconsistency between simulation and reality in traditional methods, ensuring the reliability of the control code from generation to deployment, and reducing the trial and error costs in the deployment process, providing a solid guarantee for high-precision motion control tasks, and reducing the device damage and personnel risks that may be caused by running erroneous codes directly on automated device.

It should be understood that in this embodiment, after configuration synchronization is successful, the axis numbers of the simulation motion engine and the real-time motion engine correspond one to one, and the simulation motion engine and the real-time motion engine can call the same set of motion control function libraries to ensure that the operating mechanisms and algorithms of the two are consistent. At the same time, the axis numbers controlled by the real-time motion engine can start from axis 0, axis 1, axis 2, and axis 3, and are directly bound to the actual axes on the automated device. Therefore, when the real-time motion engine is running, the actual automated device will immediately execute according to the control instructions; the simulation motion engine can manipulate the corresponding three-dimensional simulation model when it is running. Especially in complex motion logic or high-risk scenarios, the simulation model can intuitively display the motion effect, and users can find potential problems before the code actually runs on the automated device. Finally, when the virtual engine is verified, the code will be handed over to the real-time motion engine and executed on the actual automated device. This mechanism not only ensures the consistency of the operation of the virtual environment and the actual equipment, but also provides users with a safe and reliable code verification process, greatly reducing the operation risk.

In this embodiment, the reliability of the final target control code can be significantly improved through multi-level verification and multiple iterative optimization of simulation motion engine verification, simulation verification and process data verification. At the same time, when all multi-level verifications are passed, the iteratively optimized target control code can be transferred from the simulation motion engine to the real-time motion engine, and the operation of the automated device can be controlled by the output of periodic control instructions. Since both the simulation motion engine and the real-time motion engine run in a real-time environment, and the consistency of the operating mechanism and execution results is strictly guaranteed at the bottom layer, it ensures that users can make judgments and decisions based on accurate and reliable feedback. Therefore, this embodiment reduces the dependence on actual hardware, reduces the complexity and potential risks in the debugging process, and improves development efficiency.

In general, this embodiment can achieve precise control of automated device through automatic code generation, multiple verifications and error correction, improve the work efficiency of engineers, reduce the error rate, and provide an innovative and complete solution for high-security and high-reliability automation control. Through this process, this embodiment realizes the automatic generation and execution of natural language commands to motion control codes, reduces the technical threshold of users, and improves the reliability and flexibility of the automation control code generation and verification method proposed in this embodiment.

At the same time, this embodiment also introduces user judgment and decision-making steps in key links such as control code generation, simulation verification, and execution decision-making, so that users can monitor and intervene in the entire code generation and verification process in real time. This human-machine collaborative mechanism effectively avoids the potential risks that may be caused by full automation, while enhancing the user's trust in the generated code and its execution effect. In control scenarios with high security requirements, user participation not only improves the transparency of the system, but also ensures the reliability and applicability of the final code.

This embodiment discloses transmitting the initial control code to the simulation motion engine for device simulation operation, obtaining the code execution result, and semantically matching the code execution result with the natural language command to generate the first verification result; in response to that a semantic matching degree between an operation result and the natural language command is lower than a preset matching threshold, triggering an error correction process; querying the knowledge graph database according to operation error information to obtain error API node information, the error API node information includes but is not limited to API explanation information, sample error code, sample error code meaning and sample error code optimization suggestion; generating a first correction control code according to the error API node information and the initial control code; re-executing the first correction control code and updating the first verification result. After the user confirms the first verification result, driving a three-dimensional simulation model through the simulation motion engine to display a device motion process corresponding to the initial control code, and generating a second verification result, so that the user visually observes whether a device action corresponding to the initial control code in the three-dimensional simulation model meets the control requirements through the second verification result; after the user confirms the second verification result, periodically collecting motion process data of the simulation motion engine during operation, and generating a third verification result according to the motion process data, wherein the motion process data includes but is not limited to position, speed, current feedback and IO status of a control axis; and after the user confirms the third verification result, using the control code finally confirmed by the user as the target control code.

In addition, in this embodiment, the software motion control system further includes a real-time motion engine, in response to user's execution decision, synchronizing run-time environment configuration of the simulation motion engine to the real-time motion engine, after the configuration synchronization, axis numbers of the simulation motion engine and the real-time motion engine correspond one to one, and the simulation motion engine and the real-time motion engine use same motion control function library; and sending the control code to the real-time motion engine to periodically control an automated device based on the target control code through the real-time motion engine.

In this embodiment, through multi-level verification and multiple iterative optimization of simulation motion engine verification, simulation verification and process data verification, the reliability of the final target control code is significantly improved. At the same time, when all multi-level verifications are passed, the target control code can be transferred from the simulation motion engine to the real-time motion engine, and the operation of the automated device can be controlled by the output of periodic control instructions. Since both the simulation motion engine and the real-time motion engine run in a real-time environment, and the consistency of the operating mechanism and execution results is strictly guaranteed at the bottom layer, which ensures that users can make judgments and decisions based on accurate and reliable feedback. Therefore, this embodiment reduces the dependence on actual hardware, reduces the complexity and potential risks in the debugging process, and improves development efficiency.

For example, in order to help understand the technical concept or technical principle of the method for automated control code generation and verification after the present embodiment is combined with the above-mentioned embodiments, please refer to FIG. 9, which is a brief flowchart of the method for automated control code generation and verification of the present application, which is as follows.

1. Start: the system starts the task processing flow.
2. The user inputs a natural language command: the user inputs a natural language command through the dialogue human-computer interface, and the system receives and performs semantic analysis on the command.

3. The main task is decomposed into subtasks: after the large language model semantically analyzes the natural language command input by the user, the corresponding control main task is decomposed into multiple control subtasks for further processing.
4. Find subtask related code in the vector database: query the code examples or modules related to the control subtask from the constructed vector database, that is, the sample code snippets for reference in code generation.
5. Find API related nodes and relationships in the knowledge graph database: use the knowledge graph, extract the API nodes and their call relationships corresponding to the sample code snippets involved in the control subtask, that is, API structured information, to support the overall and structured analysis of code generation.
6. Large language model generates control code: the large language model automatically generates initial control code by combining natural language commands input by the user, sample code snippets matched by the vector database, and API structured information found in the knowledge graph database.
7. Simulation motion engine executes code: the generated initial control code is executed by the simulation motion engine to simulate the action of the automated device and record feedback information, that is, the code execution result.
8. Run 3D simulation: after the system completes the correspondence between the virtual control axis and IO and the virtual axis and virtual device in the three-dimensional (3D) simulation model generated after the automated device is modeled through object mapping, it uses the results of the simulation motion engine to run the 3D simulation model, intuitively display the device operation process, and provide visual verification for users.
9. Feedback the execution result to the large language model and compare it with the user's natural language command: compare the code execution result of the simulation motion engine according to the initial control code with the natural language command entered by the user to verify whether the code execution result and syntax are correct.
10. No syntax errors and results are consistent (first large model verification): verify whether the syntax of the generated code is correct and whether the execution result conforms to the user's natural language command; if passed, proceed to the next step of simulation verification, otherwise search for relevant content in the vector and knowledge graph database according to the running error information, obtain the error API section information, and return to regenerate the code.
11. 3D simulation process monitoring is correct (second simulation verification): the user monitors the device operation and key information in the three-dimensional simulation model in real time to verify whether the motion behavior is in line with expectations; if there is a problem, the user proposes a correction command, that is, the above-mentioned interactive adjustment command, regenerates the second correction control code and verifies it.
12. Simulation motion engine sampling data is correct (third process verification): the simulation motion engine periodically collects motion process data (such as control axis position, speed, current feedback, etc.), and the user compares the numerical value with the expected expected value to ensure that the data is correct; if there is a problem, the user needs to correct the instruction again.

13. The user makes an execution decision: the system presents the simulation results and sampled data to the user, who makes an execution decision to decide whether to deploy the control code to the actual device.

14. The real-time motion engine sends the control command to the automated device: after the user confirms, the system sends the control command to the automated device through the real-time motion engine to ensure that the actual device behavior is consistent with the simulation.

15. End: the task is completed and the process ends.

It should be noted that the above examples are only to understand the present application and do not constitute a limitation on the method for automated control code generation and verification of the present application. More simple transformations based on this technical concept are all within the scope of the present application.

The present application further provides an apparatus for automated control code generation and verification. As shown in FIG. 10, FIG. 10 is a structure diagram of modules of an apparatus for automated control code generation and verification according to an embodiment of the present application. In this embodiment, the apparatus for automated control code generation and verification includes an interaction module 501, a code positioning module 502, a relation acquisition module 503, a code generation module 504 and a code execution module 505.

The interaction module 501 is configured for receiving a natural language command, and the natural language command is configured to instruct the large language model to output a code text that meets control requirements corresponding to the natural language command.

The code positioning module 502 is configured for performing matching retrieval on a vector database according to the natural language command to obtain a sample code snippet.

The relation acquisition module 503 is configured for obtaining API structured information corresponding to the sample code snippet from a knowledge graph database.

The code generation module 504 is configured for generating an initial control code according to the sample code snippet and the API structured information.

The code execution module 505 is configured for performing a multi-level virtual operation verification on the initial control code in a software motion control system, and generating a target control code according to multi-level verification results confirmed multiple times by the user and the initial control code.

In an embodiment, the code positioning module 502 is further configured for performing semantic analysis on a code generation statement to obtain a main control task.

The code positioning module 502 is further configured for decomposing the main control task to obtain several control subtasks.

The code positioning module 502 is further configured for performing matching retrieval on the vector database according to the control subtasks to obtain the sample code snippet.

In an embodiment, the code execution module 505 is further configured for transmitting the initial control code to the simulation motion engine for device simulation operation to obtain a code execution result, and semantically matching the code execution result with the natural language command to generate a first verification result.

The code execution module 505 is further configured for after the user confirms the first verification result, driving a three-dimensional simulation model through the simulation motion engine to display a device motion process corresponding to the initial control code, and generating a second verification result, so that the user visually observes whether a device action corresponding to the initial control code in the three-dimensional simulation model meets the control requirements through the second verification result.

The code execution module 505 is further configured for after the user confirms the second verification result, periodically collecting motion process data of the simulation motion engine during operation, and generating a third verification result according to the motion process data, the motion process data includes but is not limited to position, speed, current feedback and IO status of a control axis.

The code execution module 505 is further configured for after the user confirms the third verification result, using the control code finally confirmed by the user as the target control code.

In an embodiment, the code execution module 505 is further configured for in response to that a semantic matching degree between an operation result and the natural language command is lower than a preset matching threshold, triggering an error correction process.

The code execution module 505 is further configured for querying the knowledge graph database according to operation error information to obtain error API node information, the error API node information includes but is not limited to API explanation information, sample error code, sample error code meaning and sample error code optimization suggestion.

The code execution module 505 is further configured for generating a first correction control code according to the error API node information and the initial control code.

The code execution module 505 is further configured for re-executing the first correction control code and updating the first verification result.

In an embodiment, the code execution module 505 is further configured for in response to user's interactive adjustment instructions for the three-dimensional simulation model, updating the natural language command.

The code execution module 505 is further configured for regenerating the second correction control code according to the updated natural language command, and iteratively performing the multi-level virtual operation verification according to the second correction code.

In an embodiment, the code execution module 505 is further configured for dividing the motion process data into multiple verification intervals according to a preset time stage.

The code execution module 505 is further configured for in each verification interval, comparing, by the user, a real-time parameter with an expected value of the corresponding stage to generate the third verification result.

In an embodiment, the software motion control system further includes a real-time motion engine, and the code execution module 505 is further configured for in response to user's execution decision, synchronizing runtime environment configuration of the simulation motion engine to the real-time motion engine, after the configuration synchronization, axis numbers of the simulation motion engine and the real-time motion engine correspond one to one, and the simulation motion engine and the real-time motion engine use same motion control function library.

The code execution module 505 is further configured for sending the control code to the real-time motion engine to periodically control an automated device based on the target control code through the real-time motion engine.

The apparatus for automated control code generation and verification of the present application adopts the method for automated control code generation and verification in the above embodiments, and can solve the technical problem of automated control code generation. Compared with the related art, the beneficial effects of the apparatus for automated control code generation and verification provided by the present application are the same as the beneficial effects of the method for automated control code generation and verification provided by the above embodiments, and other technical features in the apparatus for automated control code generation and verification are the same as the features disclosed in the above embodiment method, which will not be repeated herein.

The present application further provides a device for automated control code generation and verification, including: at least one processor and a memory in communication with the at least one processor. The memory stores instructions executable by the at least one processor, and the instructions are executed by the at least one processor so that the at least one processor can execute the method for automated control code generation and verification in the above embodiments.

The device further includes a software motion control system, which includes a simulation motion engine and a real-time motion engine.

Referring to FIG. 11 below, a schematic structural diagram of a device for automated control code generation and verification suitable for implementing the embodiment of the present application is shown. The device for automated control code generation and verification in the embodiment of the present application may include but is not limited to mobile terminals such as mobile phones, laptop computers, digital broadcast receivers, Personal Digital Assistants (PDAs), Portable Application Descriptions (PADs), Portable Media Players (PMPs), vehicle-mounted terminals (such as vehicle-mounted navigation terminals), etc., and fixed terminals such as digital TVs, desktop computers, etc. The device for automated control code generation and verification shown in FIG. 6 is only an example and should not impose any restrictions on the functions and scope of the present application.

As shown in FIG. 6, the device for automated control code generation and verification may include a processing device 1001 (e.g., a central processing unit, a graphics processing unit, etc.), which can perform various appropriate actions and processes according to a program stored in a read-only memory (ROM) 1002 or a program loaded from a storage device 1003 to a random access memory (RAM) 1004. Various programs and data required for the operation of the device for automated control code generation and verification are also stored in the random access memory 1004. The processing device 1001, the read-only memory 1002, and the random access memory 1004 are connected to each other via a bus 1005. An input/output (I/O) interface 1006 is also connected to the bus. Typically, the following systems can be connected to the I/O interface 1006: input devices 1007 including, for example, a touch screen, a touchpad, a keyboard, a mouse, an image sensor, a microphone, an accelerometer, a gyroscope, etc.; output devices 1008 including, for example, a liquid crystal display (LCD), a speaker, a vibrator, etc.; storage devices 1003 including, for example, a tape, a hard disk, etc.; communication devices 1009 and a software motion control system 1010. The communication device 1009 can allow the device for automated control code generation and verification to communicate wirelessly or wired with other devices to exchange data. The software motion control system 1010 can convert an ordinary PC into a real-time system. It does not require a dedicated control chip, but runs on the general CPU of the PC, where the simulation motion engine and the real-time motion control engine run on a dedicated CPU core (Windows and other programs run on other CPU cores). The software motion control system 1010 has a high degree of modularity, powerful available computing power, and high execution efficiency. It can be seamlessly combined with the large language model of AI to quickly run and verify the control code it generates and perform process sampling and feedback execution results in real time, which has advantages that hardware controllers do not have. Although the drawings show the device for automated control code generation and verification having various systems, it should be understood that it is not required to implement or possess all of the systems shown, and more or fewer systems may be implemented or possessed instead.

In particular, according to the embodiments disclosed in the present application, the process described above with reference to the flowchart can be implemented as a computer software program. For example, the embodiments disclosed in the present application include a program product for automated control code generation and verification, which includes a program for automated control code generation and verification carried on a computer-readable medium, and the program for automated control code generation and verification contains program code for executing the method shown in the flowchart. In such an embodiment, the program for automated control code generation and verification can be downloaded and installed from a network through a communication device, or installed from a storage device 1003, or installed from a read-only memory 1002. When the program for automated control code generation and verification is executed by the processing device 1001, the above functions defined in the method of the embodiment disclosed in the present application are executed.

The device for automated control code generation and verification of the present application adopts the method for automated control code generation and verification in the above embodiments, and can solve the technical problem of automated control code generation. Compared with the related art, the beneficial effects of the device for automated control code generation and verification provided by the present application are the same as the beneficial effects of the method for automated control code generation and verification provided by the above embodiments, and other technical features in the device for automated control code generation and verification are the same as the features disclosed in the above embodiment method, which will not be repeated herein.

It should be understood that the various parts disclosed in the present application can be implemented by hardware, software, firmware or a combination thereof. In the description of the above implementation, specific features, structures, materials or characteristics can be combined in any one or more embodiments or examples in a suitable manner.

The above are only specific implementations of the present application, but the protection scope of the present application is not limited to this. Any technician familiar with the technical field can easily think of changes or replacements within the technical scope disclosed in the present application, which should be covered within the protection scope of the present application. Therefore, the protection scope of the present application shall be based on the protection scope of the claims.

The present application provides a storage medium having computer-readable program instructions (i.e., a program for automated control code generation and verification) stored thereon, and the computer-readable program instructions are configured to execute the method for automated control code generation and verification in the above-mentioned embodiments.

The storage medium provided in the present application may be, for example, a USB flash drive, but is not limited to electrical, magnetic, optical, electromagnetic, infrared, or semiconductor systems, systems or devices, or any combination thereof. More specific examples of storage medium may include, but are not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In this embodiment, the storage medium may be any tangible medium containing or storing a program that may be used by or in conjunction with an instruction execution system, system or device. The program code contained on the storage medium may be transmitted using any suitable medium, including but not limited to: wires, optical cables, Radio Frequency (RF), etc., or any suitable combination thereof.

The above storage medium may be included in the device for automated control code generation and verification; or it may exist independently without being assembled into the device for automated control code generation and verification.

The above storage medium carries one or more programs. When the above one or more programs are executed by the device for automated control code generation and verification, the device for automated control code generation and verification performed the steps of the method for automated control code generation and verification.

The program code for automated control code generation and verification for performing the operations of the present application may be written in one or more programming languages or a combination thereof, including object-oriented programming languages such as Java, Python, C++, and conventional procedural programming languages such as "C" or similar programming languages. The program code may be executed entirely on the user's computer, partially on the user's computer, as a separate software package, partially on the user's computer and partially on a remote computer, or entirely on a remote computer or server. In the case of a remote computer, the remote computer may be connected to the user's computer through any type of network, including a local area network (LAN) or a wide area network (WAN), or may be connected to an external computer (e.g., through the Internet using an Internet service provider).

The flowcharts and block diagrams in the accompanying drawings illustrate the possible architecture, functions and operations of the system, method and automated control code generation and verification program product according to various embodiments of the present application. In this regard, each box in the flowchart or block diagram may represent a module, program segment or part of the code, which contains one or more executable instructions for implementing the specified logical function. It should also be noted that in some alternative implementations, the functions marked in the box may also occur in an order different from that marked in the accompanying drawings. For example, two boxes represented in succession may actually be executed substantially in parallel, and they may sometimes be executed in the opposite order, depending on the functions involved. It should also be noted that each box in the block diagram and/or flowchart, as well as the combination of boxes in the block diagram and/or flowchart, can be implemented by a dedicated hardware-based system that performs the specified functions or operations, or can be implemented by a combination of dedicated hardware and computer instructions.

The modules described in the embodiments of the present application can be implemented by software or by hardware. The name of the module does not constitute a limitation on the unit itself in some cases.

The readable storage medium provided in the present application is a storage medium, which stores computer-readable program instructions (i.e., program for automated control code generation and verification) for executing the above-mentioned method for automated control code generation and verification, and can solve the technical problem of automated control code generation. Compared with the related art, the beneficial effects of the storage medium provided in the present application are the same as the beneficial effects of the method for automated control code generation and verification provided in the above-mentioned embodiments, and will not be repeated here.

The above are only some embodiments of the present application, and are not intended to limit the scope of the present application. All equivalent structural changes made using the contents of the present application specification and drawings under the technical concept of the present application, or direct/indirect application in other related technical fields are included in the scope of the present application.

What is claimed is:

1. A computer-implemented method for automated control code generation and verification, applied to a large language model, comprising:

receiving a natural language command, wherein the natural language command is configured to instruct the large language model to output a code text that meets control requirements corresponding to the natural language command;

performing matching retrieval on a vector database according to the natural language command to obtain a sample code snippet;

obtaining Application Programming Interface (API) structured information corresponding to the sample code snippet from a knowledge graph database;

generating an initial control code according to the sample code snippet and the API structured information; and performing a multi-level virtual operation verification on the initial control code in a software motion control system, and generating a target control code according to multi-level verification results confirmed multiple times by the user and the initial control code;

wherein the software motion control system comprises a simulation motion engine, and the performing the multi-level virtual operation verification on the initial control code in the software motion control system, and generating the target control code according to multi-level verification results confirmed multiple times by the user and the initial control code comprises:

transmitting the initial control code to the simulation motion engine for device simulation operation to obtain a code execution result, and semantically matching the code execution result with the natural language command to generate a first verification result;

after the user confirms the first verification result, driving a three-dimensional simulation model through the simulation motion engine to display a device motion process corresponding to the initial control code, and generating a second verification result, the user visually observes whether a device action corresponding to the initial control code in the three-dimensional simulation model meets the control requirements through the second verification result;

after the user confirms the second verification result, periodically collecting motion process data of the simulation motion engine during operation, and generating a third verification result according to the motion process data, wherein the motion process data comprises position, speed, current feedback and IO status of a control axis; and after the user confirms the third verification result, using the control code finally confirmed by the user as the target control code;

wherein the generating the first verification result comprises:

in response to a semantic matching degree between an operation result and the natural language command is lower than a preset matching threshold, triggering an error correction process;

querying the knowledge graph database according to operation error information to obtain error API node information, wherein the error API node information comprises API explanation information, sample error code, sample error code meaning and sample error code optimization suggestion;

generating a first correction control code according to the error API node information and the initial control code; and re-executing the first correction control code and updating the first verification result;

wherein the generating the third verification result according to the motion process data comprises:

dividing the motion process data into multiple verification intervals according to a preset time stage; and in each verification interval, comparing, by the user, a real-time parameter with an expected value of the corresponding stage to generate the third verification result;

wherein the software motion control system further comprises a real-time motion engine, and after the performing the multi-level virtual operation verification on the initial control code in the software motion control system, and generating the target control code according to the multi-level verification results confirmed multiple times by the user and the initial control code, the method further comprises:

in response to user's execution decision, synchronizing runtime environment configuration of the simulation motion engine to the real-time motion engine, wherein after the configuration synchronization, axis numbers of the simulation motion engine and the real-time motion engine correspond one to one, and the simulation motion engine and the real-time motion engine use same motion control function library; and sending the control code to the real-time motion engine to periodically control an automated device based on the target control code through the real-time motion engine.

2. The computer-implemented method according to claim 1, wherein the performing matching retrieval on the vector database according to the natural language command to obtain the sample code snippet comprises:

performing semantic analysis on a code generation statement to obtain a main control task;

decomposing the main control task to obtain several control subtasks; and performing matching retrieval on the vector database according to the control subtasks to obtain the sample code snippet.

3. The computer-implemented method according to claim 1, wherein after the generating the second verification result, the method further comprises:

in response to user's interactive adjustment instructions for the three-dimensional simulation model, updating the natural language command; and regenerating the second correction control code according to the updated natural language command, and iteratively performing the multi-level virtual operation verification according to the second correction code.

4. A device for automated control code generation and verification, comprising:

a memory, a processor, and a program for automated control code generation and verification stored in the memory and executable on the processor, wherein the program for automated control code generation and verification is configured to implement a computer-implemented method for automated control code generation and verification applied to a large language model;

the device further comprises a software motion control system, and the software motion control system comprises a simulation motion engine and a real-time motion engine; and the method comprises:

receiving a natural language command, wherein the natural language command is configured to instruct the large language model to output a code text that meets control requirements corresponding to the natural language command;

performing matching retrieval on a vector database according to the natural language command to obtain a sample code snippet;

obtaining Application Programming Interface (API) structured information corresponding to the sample code snippet from a knowledge graph database;

generating an initial control code according to the sample code snippet and the API structured information; and performing a multi-level virtual operation verification on the initial control code in the software motion control system, and generating a target control code according to multi-level verification results confirmed multiple times by the user and the initial control code;

wherein the performing the multi-level virtual operation verification on the initial control code in the software motion control system, and generating the target control code according to multi-level verification results confirmed multiple times by the user and the initial control code comprises:

transmitting the initial control code to the simulation motion engine for device simulation operation to obtain a code execution result, and semantically matching the code execution result with the natural language command to generate a first verification result;

after the user confirms the first verification result, driving a three-dimensional simulation model through the simulation motion engine to display a device motion process corresponding to the initial control code, and generating a second verification result, the user visually observes whether a device action corresponding to the initial control code in the three-dimensional simulation model meets the control requirements through the second verification result;

after the user confirms the second verification result, periodically collecting motion process data of the simulation motion engine during operation, and generating a third verification result according to the motion process data, wherein the motion process data comprises position, speed, current feedback and IO status of a control axis; and after the user confirms the third verification result, using the control code finally confirmed by the user as the target control code;

wherein the generating the first verification result comprises:

in response to a semantic matching degree between an operation result and the natural language command is lower than a preset matching threshold, triggering an error correction process;

querying the knowledge graph database according to operation error information to obtain error API node information, wherein the error API node information comprises API explanation information, sample error code, sample error code meaning and sample error code optimization suggestion;

generating a first correction control code according to the error API node information and the initial control code; and re-executing the first correction control code and updating the first verification result;

wherein the generating the third verification result according to the motion process data comprises:

dividing the motion process data into multiple verification intervals according to a preset time stage; and in each verification interval, comparing, by the user, a real-time parameter with an expected value of the corresponding stage to generate the third verification result;

wherein after the performing the multi-level virtual operation verification on the initial control code in the software motion control system, and generating the target control code according to the multi-level verification results confirmed multiple times by the user and the initial control code, the method further comprises:

in response to user's execution decision, synchronizing runtime environment configuration of the simulation motion engine to the real-time motion engine, wherein after the configuration synchronization, axis numbers of the simulation motion engine and the real-time motion engine correspond one to one, and the simulation motion engine and the real-time motion engine use same motion control function library; and sending the control code to the real-time motion engine to periodically control an automated device based on the target control code through the real-time motion engine.

5. A non-transitory computer-readable storage medium, wherein a program for automated control code generation and verification is stored on the non-transitory computer-readable storage medium, and when the program for automated control code generation and verification is executed by a processor, a computer-implemented method for automated control code generation and verification is implemented;

wherein the method is applied to a large language model and comprises:

receiving a natural language command, wherein the natural language command is configured to instruct the large language model to output a code text that meets control requirements corresponding to the natural language command;

performing matching retrieval on a vector database according to the natural language command to obtain a sample code snippet;

obtaining Application Programming Interface (API) structured information corresponding to the sample code snippet from a knowledge graph database;

generating an initial control code according to the sample code snippet and the API structured information; and performing a multi-level virtual operation verification on the initial control code in a software motion control system, and generating a target control code according to multi-level verification results confirmed multiple times by the user and the initial control code;

wherein the software motion control system comprises a simulation motion engine, and the performing the multi-level virtual operation verification on the initial control code in the software motion control system, and generating the target control code according to multi-level verification results confirmed multiple times by the user and the initial control code comprises:

transmitting the initial control code to the simulation motion engine for device simulation operation to obtain a code execution result, and semantically matching the code execution result with the natural language command to generate a first verification result;

after the user confirms the first verification result, driving a three-dimensional simulation model through the simulation motion engine to display a device motion process corresponding to the initial control code, and generating a second verification result, the user visually observes whether a device action corresponding to the initial control code in the three-dimensional simulation model meets the control requirements through the second verification result;

after the user confirms the second verification result, periodically collecting motion process data of the simulation motion engine during operation, and generating a third verification result according to the motion process data, wherein the motion process data comprises position, speed, current feedback and IO status of a control axis; and after the user confirms the third verification result, using the control code finally confirmed by the user as the target control code;

wherein the generating the first verification result comprises:

in response to a semantic matching degree between an operation result and the natural language command is lower than a preset matching threshold, triggering an error correction process;

querying the knowledge graph database according to operation error information to obtain error API node information, wherein the error API node information comprises API explanation information, sample error code, sample error code meaning and sample error code optimization suggestion;

generating a first correction control code according to the error API node information and the initial control code; and re-executing the first correction control code and updating the first verification result;

wherein the generating the third verification result according to the motion process data comprises:

dividing the motion process data into multiple verification intervals according to a preset time stage; and in each verification interval, comparing, by the user, a real-time parameter with an expected value of the corresponding stage to generate the third verification result;

wherein the software motion control system further comprises a real-time motion engine, and after the performing the multi-level virtual operation verification on the initial control code in the software motion control system, and generating the target control code according to the multi-level verification results confirmed multiple times by the user and the initial control code, the method further comprises:

in response to user's execution decision, synchronizing runtime environment configuration of the simulation motion engine to the real-time motion engine, wherein after the configuration synchronization, axis numbers of the simulation motion engine and the real-time motion engine correspond one to one, and the simulation motion engine and the real-time motion engine use same motion control function library; and sending the control code to the real-time motion engine to periodically control an automated device based on the target control code through the real-time motion engine.

* * * * *